United States Patent
Klebanov

(10) Patent No.: US 6,397,327 B1
(45) Date of Patent: May 28, 2002

(54) METHOD AND APPARATUS FOR CONFIGURING A COMPUTER SYSTEM

(75) Inventor: Ilya Klebanov, Vaughan (CA)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/272,464

(22) Filed: Mar. 19, 1999

(51) Int. Cl.⁷ .................................................. G06F 9/06
(52) U.S. Cl. ................................................ 713/1; 710/8
(58) Field of Search .............................. 713/1, 2, 100; 710/8, 10

(56) References Cited

U.S. PATENT DOCUMENTS

| | | | | |
|---|---|---|---|---|
| 5,758,154 A | * | 5/1998 | Qureshi ........................ | 713/1 |
| 5,822,565 A | * | 10/1998 | DeRosa, Jr. et al. ........ | 713/1 X |
| 5,949,979 A | * | 9/1999 | Snow et al. ................. | 710/8 X |
| 6,182,212 B1 | * | 1/2001 | Atkins et al. ................. | 713/1 |
| 6,263,387 B1 | * | 7/2001 | Chrabaszcz ................. | 713/1 X |

* cited by examiner

*Primary Examiner*—Thomas M. Heckler
(74) *Attorney, Agent, or Firm*—Vedder, Price, Kaufman & Kammholz

(57) ABSTRACT

A method and apparatus for recognizing and initializing second level peripherals on busses local to add-on cards. During startup, a personal computer receives an identifier from an add-on peripheral. A driver is executed that initializes the add-on peripheral, and determines whether any peripherals are attached to a secondary bus associated with the add-on peripheral. When a peripheral is identified on the secondary bus, information concerning the peripheral is added to a configuration file.

26 Claims, 3 Drawing Sheets

METHOD AND APPARATUS FOR CONFIGURING A COMPUTER SYSTEM

FIELD OF THE INVENTION

The present invention relates to the configuration of computer systems, and specifically to the configuration of computer system during start-up.

BACKGROUND OF THE INVENTION

Prior to the advent of plug-and-play technology, adding add-on peripherals (add-on boards or add-on cards) to personal computers was often a burdensome task. Generally, a user desiring to add a peripheral to a personal computer (PC) would have to not only add the peripheral by opening the computer case, but would also have to modify the card itself. Modifications to add-on cards often consisted of setting dip switches, adding and/or moving jumpers, or otherwise setting switches on the card itself. The actual settings of these modifications was a function of several variables, such as the make of computer used, the configuration of other hardware in the system, and the software used in the system, including the operating system. As a result, the level of complexity involved with adding peripherals was often more than PC owners could handle. In order to simplify the task of adding peripherals, plug-and-play technologies were implemented.

Plug-and-play technology in the PC market largely automated the tasks of configuring peripheral boards. A plug-and-play peripheral board would be automatically detected by the computer during a start-up routine. The sequence for detection of add-on peripherals would generally consist of a start-up routine sending some signal to the plug-and-play device. In response, the plug-and-play device would send a unique identifier identifying itself. Upon receiving this information, the start-up routine would locate a batch file for initializing and configuring the plug-and-play compatible peripheral. During the stat-up routine, the peripheral receives the configuration information necessary from the batch program to be recognized by the operating system during normal operations.

While the advent of plug-and-play has greatly simplified the task of adding peripherals to personal computers, existing plug-and-play technology does not detect second level peripherals which reside on secondary busses (local busses) to the peripherals themselves. For example, a video/multimedia controller added to a system as plug-and-play device may in turn have a local bus, isolated from the system bus, capable of having one or more add-on peripherals of its own. Examples of such second level add-on peripherals would include TV tuners, user input devices, sound cards, or other peripherals. Upon installing the plug-and-play multimedia board, the computer would only have visibility to main board, not the peripherals located on the secondary, or local, busses. As a result, it is still necessary, even with plug-and-play devices, to manually intervene by manually editing configuration files or running programs during normal operation to allow the personal computer to properly recognize and utilize these secondary peripherals. Often this requires a re-boot of the system. One proposed solution for identifying secondary busses would require a unique command to be issued during startup requesting each identified peripheral to respond with any devices attached to its secondary busses. However, this proposed implementation will result in the need for a new start-up routine, and as of yet is not available to users or manufacturers.

Therefore, a method and apparatus for identifying secondary peripherals on add-on boards would be desirable.

It should be appreciated that the figures herein have been included for illustrative purposes only. As a result, other embodiments of the invention may exist, and the dimensions and relationships of the specific components within the figures are not intended to be to scale.

DETAILED DESCRIPTION OF THE DRAWINGS

In one embodiment of the present invention, a start-up routine for a personal computer system identifies a first peripheral, such as a video graphics adapter (VGA). In response, the start-up routine loads and executes a software driver associated with the VGA. During execution, the driver attempts to access a first peripheral location of the VGA, where the first peripheral location of the VGA is the local to the VGA itself. Based upon a result of the attempted access, a determination is made whether or not a device is actually located at the first peripheral location. When a device is located at the first peripheral location, information relating to the device is added to the configuration, or registry file of the computer system. Next, the software driver attempts to access another peripheral at a different location. This process repeats until all possible locations associated with the local bus of the peripheral have been attempted. The registry is updated for each unexpected peripheral that is identified, or if an expected peripheral is not identified the registry is modified remove it from the registry.

Figure 1:
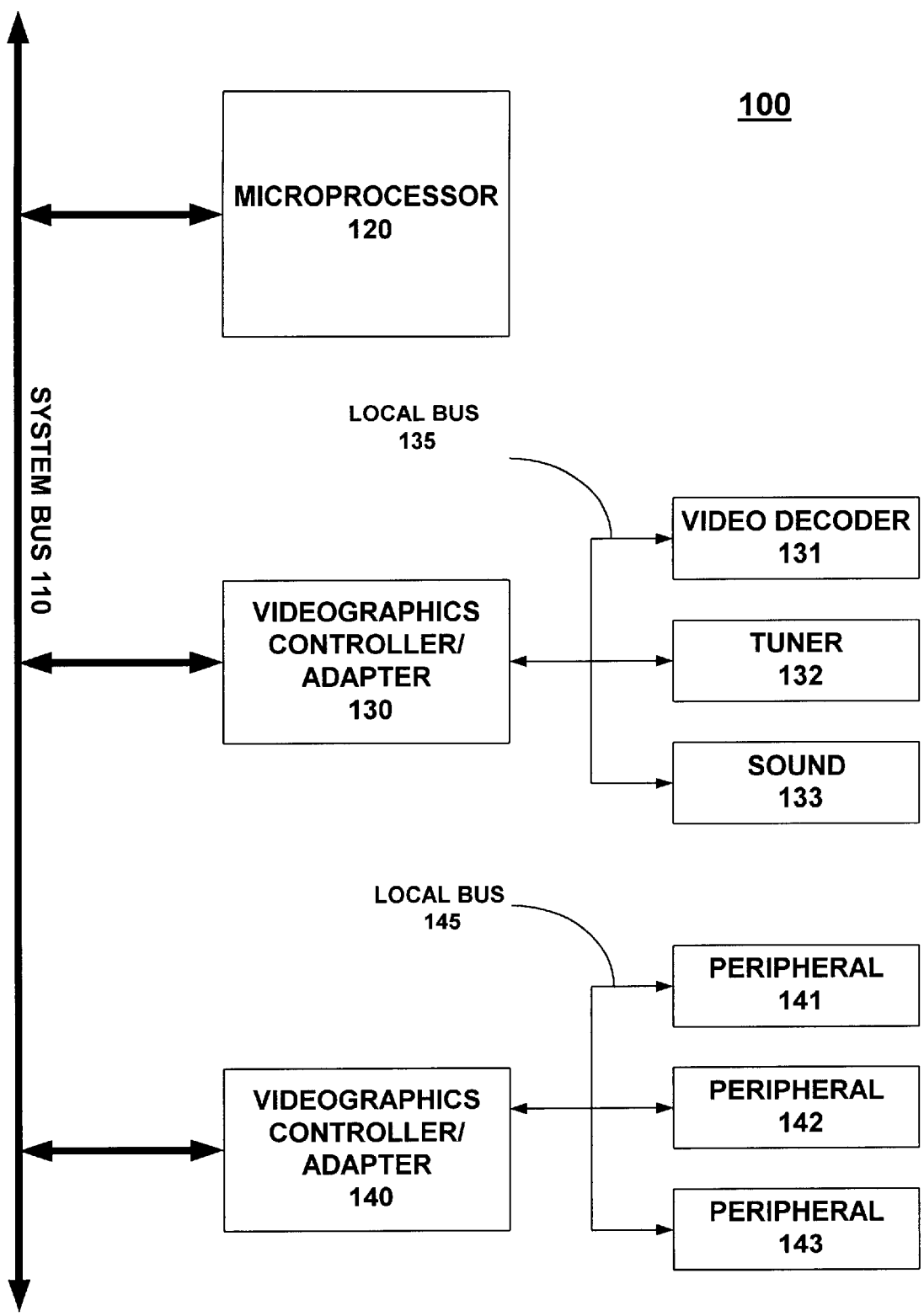
FIG. 1 illustrates, in block diagram form, a portion of a personal computer including a microprocessor and add-on board in accordance with the present invention.

FIG. 1 illustrates a portion of a computer system 100. The portion 100 includes a system bus 110 bi-directionally connected to a microprocessor 120, a first video graphics controller or adapter (VGA) 130, and a second VGA 140.

The first VGA 130 is connected to a local bus 135. The local bus 135 is a peripheral bus local to the VGA 130. The local bus 135 can bi-directionally couple one or more peripherals to the VGA 130. FIG. 1 illustrates three specific peripheral types connected to VGA 130 including a video decoder 131, a tuner 132, and a sound card 133. Likewise, FIG. illustrates a second VGA 140 having a local bus 145 having a plurality of peripherals connected to it. Three generic peripherals 141, 142, and 143 are illustrated to be connected to the local bus 145. One skilled in the art will recognize that the actual number of peripherals that can be connected to a local bus may vary.

In operation, a start-up routine is executed by the microprocessor 120. In a specific embodiment, during the start-up routine, the microprocessor 120 will poll the system bus 110 to determine what add-on cards or peripherals have been connected to the system bus 110. As illustrated in FIG. 1, two add-on cards, VGA 130 and VGA 140, are accessible to the microprocessor 120 on the system bus 110.

During start-up, the VGA 130 will respond back with an identifier indicating its manufacturer and other information allowing the VGA 130 to be identified as a specific product from that manufacturer. Based upon this information, the microprocessor accesses a software (s/w) driver associated with the VGA 130 and executes the driver in order to configure the VGA 130 for proper operation. In accordance with the present invention, the peripheral drivers incorporate commands necessary to exercise the peripheral card in such a manner to query the cards secondary or local busses, and receive a response back indicating the peripherals that reside on the local bus, if any. Based on this response, the peripheral driver can further modify the registry, or configuration files, associated with the personal computer so that when the start-up routine of the personal computer is completed, the operating system will have visibility to the peripherals associated with the add-on cards, such as the VGAs 130 and 140.

In the prior art, the peripheral drivers executed by the microprocessor 120 have not been used to detect peripherals on a secondary or local bus. Therefore, when a second bus such as bus 135, which could be an $I^2C$ bus, a MVP bus, some kind of user intervention is needed to properly configure the computer system. Often, these local busses, are small pin count serial busses capable of accessing a plurality of secondary add-on cards, such as the video decoder 131, the tuner 132 and sound card 133 of FIG. 1. By providing the ability to use peripheral drivers to query the individual peripheral adapters to identify its local add-on devices, the computer system is capable of identifying and taking full advantage of all peripherals, even those on local busses, without additional manual intervention. This increases the ease of installing add on cards. This is an advantage over the prior art methods, which required manual intervention, such as a separate program to be run after the booting of the system, which would in turn modify the configuration files. Often this required the system to be restarted a second time because during the first start-up, the peripherals where not properly identified.

Yet another advantage of the present invention, is that the peripheral drivers, when properly written, can be used to access a plurality of peripherals. For example, once the VGA 130 is initialized, the VGA 140 would be recognized and in turn initialized in a similar manner. The video graphics adapter 130 and 140 can be identical peripherals. However, because of the sequencing order of the start-up routine, it is possible for the peripherals associated with each of the VGAs 130 and 140 to be identified at independent times during start-up, and the registry, or configuration files to be updated appropriately.

The peripheral driver, as executed by the microprocessor 120, can use any of several techniques to detect the devices on the local busses. For example, a VGA 130 may have fixed addresses for specific peripherals. Thus, in one embodiment, the driver could provide the peripheral with the address value of the secondary address. If the peripheral responded indicating the presence of a device at the secondary address, the driver would know what device to add to the registry because only one type of peripheral would have that specific address. In a different embodiment, the peripheral would respond with a device type also. This would allow different peripherals to have the same address. Based on the device type, the driver would modify the registry, or execute a second driver to update the system as needed based on the specific device. One skilled in the art will recognize that other combinations and can also be utilized.

Figure 2:
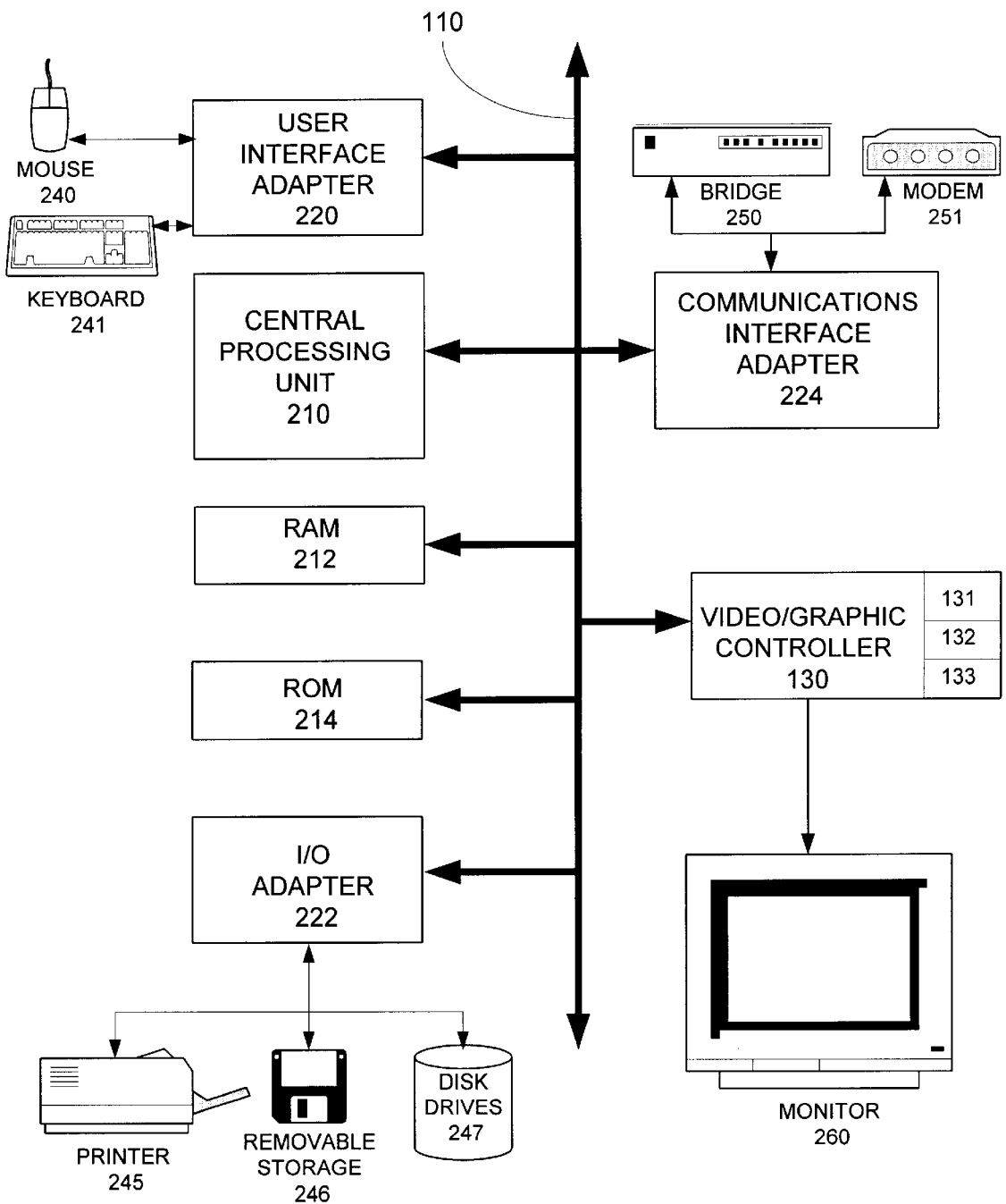
FIG. 2 illustrates in block diagram form a computer system in accordance with the present invention.

FIG. 2 illustrates a computer system 200 incorporating the video graphics controller 130 and system bus 110. The system 200 includes a random access memory 212, a read-only memory 214, and other I/O adapters. The I/O adapters include a user interface adapter 220, such as would be used to interface to a mouse 240, or a keyboard 241, and I/O adapter 222 such as would be used to interface with a printer 245, a removable storage media 246, or disk drive 247, a communications interface adapter 224 such as would be connected to a bridge 250 and/or a modem 251 which provides communications to an external network (not shown). The video graphics controller 130 is connected to the bus 110 in order to display information received via the bus onto the monitor 260. Generally, the video graphics controller 130 will have a dedicated video random access memory associated with it (not shown). In addition, the second video graphics controller 140, of FIG. 1, can also be connected to the bus 110.

In the computer system 200, the peripheral drivers would generally be stored on one of the disk drives 247, or the removable storage media 246. In other embodiments, the peripheral driver can be accessed via the bridge 250, or the modem 251, as the peripheral drivers executed by the microprocessor 120 are provided by the manufacturers of the various peripheral boards. During the start-up routine, the central processing unit 210, which is part of the microprocessor 120 of FIG. 1, will access the appropriate peripheral driver from the disk drive 247, or removable storage media 246, and execute it as a batch file. During execution, the batch file will access the VGA 130 across the bus 110.

Figure 3:
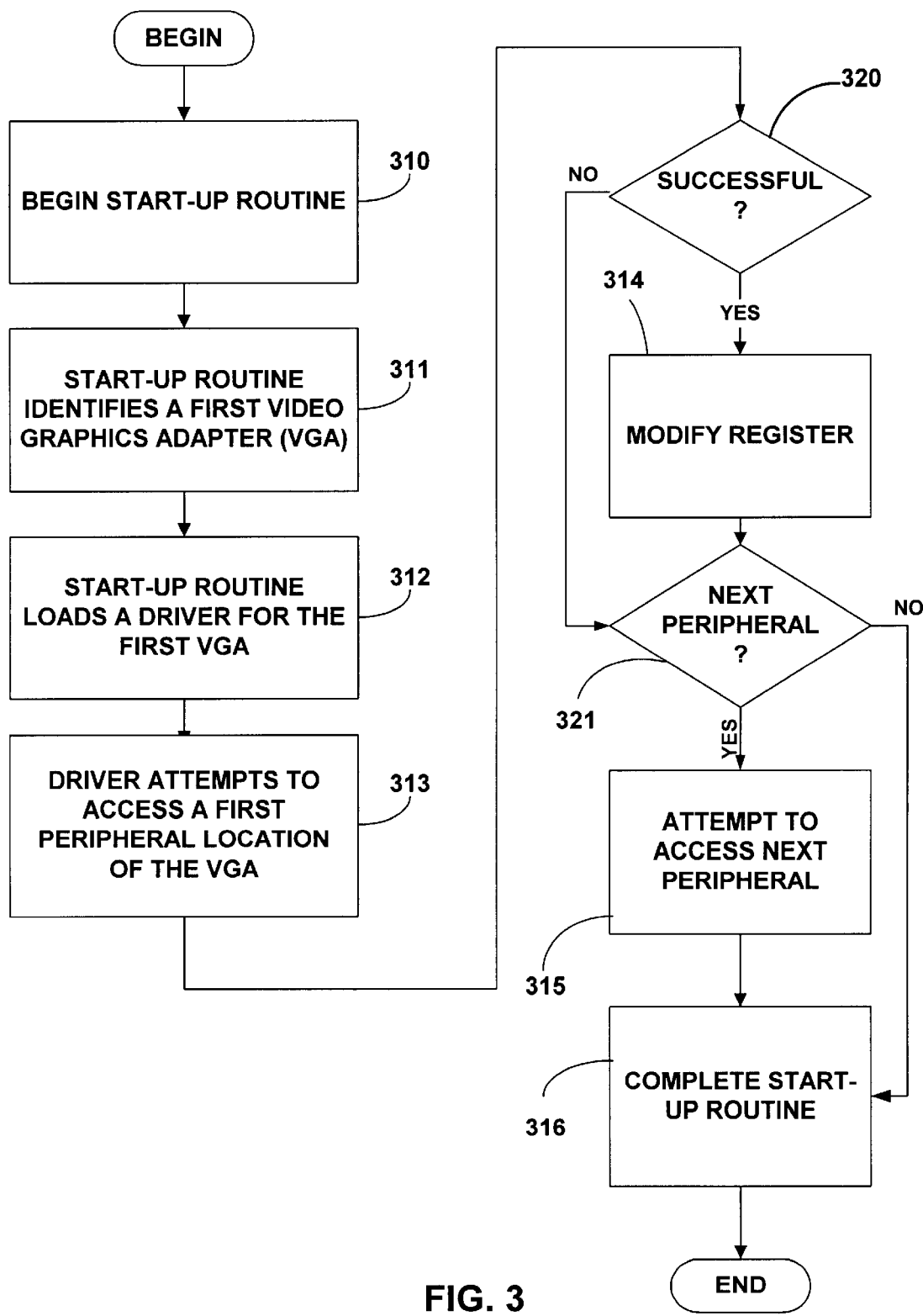
FIG. 3 illustrates, in flow diagram form, a method of initializing a computer system in accordance with the present invention.

FIG. 3 illustrates a method for implementing a specific embodiment of the present invention. At step 310, the computer begins execution of a start-up routine. In general, the start-up routine is responsible for configuring the computer system and loading an operating system to be used during normal operation. Sometime after the beginning of the start-up routine, and before its completion, step 311 is executed in order to identify existing and/or new peripherals including the first video graphics adapter 130. One example of such a command is the PNP__Add__New__DevNode call used by Microsoft's Windows98. At step 312, after the peripheral is identified, the start-up routine will load and execute a driver associated with the identified first VGA.

At step 313, the video driver will attempt to access a first peripheral location of the video graphics adapter. Note that in the embodiment illustrated, the central processing unit 210 executing the start-up routine does not have direct access to the first peripheral location of the VGA. As previously discussed, this is because the bus is considered local to the peripheral. Next, at step 320, a determination is made whether or not the attempted access of a peripheral location was successful. When a peripheral location has successfully identified a peripheral, the flow continues at step 314 where a registry is modified to indicate the presence of the peripheral at the local level. Generally, the registry will be a configuration file associated with the computer system identifying the hardware present in the system. In other embodiments, the configuration file, or registry, can actually be registers or hardware within the computer which contain variable values indicating the presence of such hardware. Flow continues at step 321 after modification of the configuration file.

If at step 320, the first peripheral location did not respond as having a second level peripheral, the method will continue at step 321. At step 321, a determination is made whether or not the peripheral software needs to look for a next peripheral. If not, the flow proceeds to step 316 where the start-up routine is completed. Step 321 may occur because all possible address location have been attempted, because a maximum number of local peripherals have been detected, or by any other method.

If a next peripheral is to be identified, the method continues at step 315 where an attempt is made to access the next peripheral. Step 315 further includes steps similar to step 314 where a configuration file or registry is modified when a successful access of a next peripheral does occur.

By implementing the method embodied in FIG. 3, existing PCs calls can be used to execute drivers to identify peripherals on local busses that would not otherwise be accessible by the main CPU of the computer. This is an advantage over the prior art in that it allows for an automated start-up routine capable of detecting second level peripheral devices, thereby allowing for easier installation of complex add-on boards by users.

The present invention has been put forth in terms of specific embodiments not intended to be limiting to the invention itself. For example, many other specific implementations of the present invention are possible. For example, in FIG. 1, a dedicated AGP bus may reside between the microprocessor 120 and the VGA adapter 130. The presence of such a bus would allow for the peripheral driver to access the VGA 130 across the AGP bus in determining what local peripherals may reside on the VGA 130. Other types of modifications will be apparent to one skilled in the art.

I claim:

1. A method of performing a start-up routine, the method comprising:

receiving, by a host, an identifier from a peripheral having a local bus;

executing a driver corresponding to the identifier, wherein the driver communicates with the peripheral for performing the following steps:

determining a set of local devices coupled to the peripheral;

modifying a registry file in the host based on the set of local devices; and completing the start-up routine using the registry file after the step of modifying.

2. A computer peripheral system comprising:

a first input/output (IO) port connecting to first bus;

a second bus, wherein the second bus provides an interface to a plurality of add-on peripherals;

a peripheral controller coupled to the first input/output port and to the second bus; and a driver to:

determine a set of add-on peripherals connected to the second bus; and modify a registry to identify each member of the set of add-on peripherals.

3. The peripheral system of claim 2, wherein the driver is for communicating with the peripheral controller via the first bus.

4. The peripheral system of claim 3, wherein the driver includes software to be executed on a main processor external the peripheral system, and connected to the first bus.

5. The peripheral system of claim 4, wherein the driver is a software driver for Windows 98 operating system.

6. The peripheral system of claim 5, wherein the driver is executed in response to a PNP_ADD_New_DevNode call by the operating system.

7. The peripheral system of claim 2, wherein the driver is to be executed automatically during startup without user intervention.

8. The peripheral system of claim 2, wherein the driver is executed during a start-up routine.

9. The peripheral system of claim 2, wherein the first bus is a PCI (P_C_I_) bus.

10. The peripheral system of claim 2, wherein the first bus is a AGP (A_G_P_) bus.

11. The peripheral system of claim 2, wherein the second bus is an $I^2C$ bus.

12. The peripheral system of claim 2, wherein the second bus is a VIP (V_I_P_) bus.

13. The peripheral system of claim 2, wherein the computer peripheral is a Video Graphics Controller.

14. A computer system comprising:

a main processor coupled to a first bus;

a first peripheral connected to the first bus and having a second bus port;

at least one add-on peripheral connected to the second bus port;

a first set of instructions to be executed on the main processor during a start-up routine to identify the at least one add-on peripheral and to modify a registry to include information about the at least one add-on peripheral.

15. The computer system of claim 14, wherein the at least one add-on peripheral includes a multi-media peripheral.

16. The computer system of claim 14, wherein the first bus is one of a PCI bus and an AGP bus.

17. The computer system of claim 16, wherein the second bus is one of an $I^2C$ bus and a VIP bus.

18. The computer system of claim 14 further comprising:

a second peripheral connected to the first bus and having a third bus port;

at least one add-on peripheral connected to the third bus port; and a second set of instructions to be executed on the main processor during a start-up routine to identify the at least one peripheral connected to the third bus port and to modify a registry to include information about the at least one add-on peripheral connected to the third bus port.

19. A method of configuring a computer system, the method comprising the steps of:

coupling a first bus of a peripheral device to the computer system; and performing a start-up routine on the system including the sub steps of:

providing control signals to the first bus for determining a set of devices that are connected to a second bus of the peripheral device; and modifying a registry base on the connected set of devices.

20. The method of claim 19, wherein the step of modifying further comprises the substeps of:

comparing the set of devices to a list of devices in the registry; and adding devices to the registry in the set of device not listed.

21. The method of claim 19, wherein the step of modifying further comprises the substeps of:

comparing the set of connected devices to a list of devices in the registry; and removing devices from the registry that are not in the set of connected devices.

22. A computer program product comprising:

a computer readable medium having computer readable program code present thereon for implementing a startup routine comprising computer readable program code for:

providing control signals to a first bus of a computer for automatically determining a set of devices that are connected to a second bus of a peripheral device; and modifying a registry based on the set of devices.

23. A method of initializing a computer system, the method comprising the steps of:

beginning execution of an initialization routine on a first data processor;

receiving an identification signal from a first peripheral, wherein the first peripheral and the first data processor share a first bus;

executing on the first data processor a driver associated with the first peripheral, the driver comprising the steps of controlling the first peripheral through the first bus to identify a second peripheral connected to a second bus local to the first peripheral;

modifying a data file to include the identity of the second peripheral, wherein the data file is accessible by the first data processor; and completing execution of the initialization routine.

24. The method of claim 23, wherein the data file is not accessible by the first peripheral.

25. The method of claim 23, wherein the step of modifying includes determining if the second peripheral is listed in the data file.

26. The method of claim 23, further comprising the following steps prior to the step of completing execution:

receiving an identification signal from a third peripheral, wherein the third peripheral and the first data processor share the first bus;

executing on the first data processor a driver associated with the third peripheral, the driver comprising the steps of controlling the third peripheral through the first bus to identify a fourth peripheral connected to a third bus local to the third peripheral;

modifying the data file to include the identity of the fourth peripheral, wherein the data file is accessible by the first data processor.

* * * * *